(12) United States Patent
Suzuki

(10) Patent No.: US 8,988,699 B2
(45) Date of Patent: Mar. 24, 2015

(54) DEVICE, INFORMATION PROCESSING APPARATUS, INFORMATION PROCESSING SYSTEM, CONTROL METHOD, AND PROGRAM

(71) Applicant: Canon Kabushiki Kaisha, Tokyo (JP)

(72) Inventor: Shinya Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/741,807

(22) Filed: Jan. 15, 2013

(65) Prior Publication Data

US 2013/0182281 A1    Jul. 18, 2013

(30) Foreign Application Priority Data

Jan. 18, 2012  (WO) .................. PCT/JP2012-050920

(51) Int. Cl.
*G06F 3/12* (2006.01)

(52) U.S. Cl.
CPC ............ *G06F 3/1238* (2013.01); *G06F 3/1222* (2013.01); *G06F 3/1285* (2013.01)
USPC ........... 358/1.14; 358/1.1; 358/440; 705/400; 726/2

(58) Field of Classification Search
None
See application file for complete search history.

(56) References Cited

U.S. PATENT DOCUMENTS

| | | | |
|---|---|---|---|
| 6,504,621 B1* | 1/2003 | Salgado ........................ 358/1.16 |
| 6,587,861 B2* | 7/2003 | Wakai et al. .................. 715/209 |
| 6,967,738 B1* | 11/2005 | Shima .......................... 358/1.16 |
| 7,002,707 B2* | 2/2006 | Kujirai ............................ 358/1.9 |
| 7,011,462 B2* | 3/2006 | Hanaoka ......................... 400/76 |
| 7,657,753 B2* | 2/2010 | Sawada ......................... 713/183 |
| 8,384,928 B2* | 2/2013 | Nemoto ....................... 358/1.15 |
| 2002/0062453 A1* | 5/2002 | Koga ............................ 713/202 |
| 2002/0171859 A1* | 11/2002 | Chen et al. ................... 358/1.14 |
| 2005/0002066 A1* | 1/2005 | Reese et al. ................... 358/440 |
| 2006/0233580 A1* | 10/2006 | Ueda et al. ..................... 400/62 |
| 2006/0256374 A1* | 11/2006 | Shima ......................... 358/1.15 |
| 2007/0022180 A1* | 1/2007 | Cocotis et al. ............... 709/217 |
| 2007/0168514 A1* | 7/2007 | Cocotis et al. ............... 709/225 |
| 2007/0171436 A1* | 7/2007 | Manchester .................. 358/1.1 |
| 2008/0005781 A1* | 1/2008 | Koga ................................ 726/2 |
| 2008/0007759 A1* | 1/2008 | Furuyama et al. ........... 358/1.14 |
| 2009/0040546 A1* | 2/2009 | Hirakawa .................... 358/1.14 |

(Continued)

FOREIGN PATENT DOCUMENTS

| | | |
|---|---|---|
| JP | 2001-318779 A | 11/2001 |
| JP | 2002-236577 A | 8/2002 |

(Continued)

*Primary Examiner* — King Poon
*Assistant Examiner* — Ted Barnes
(74) *Attorney, Agent, or Firm* — Canon U.S.A., Inc. IP Division

(57) ABSTRACT

There are cases where an OS running on an information processing apparatus cannot automatically prompt the user to enter user input information at the time of an output operation. In such cases, where the user cannot enter user input information at the time of an output operation, a device cannot acquire user input information necessary to output print data.

When the information processing apparatus receives an instruction from the device, the information processing apparatus transmits user input information to the device.

2 Claims, 9 Drawing Sheets

(56) References Cited

U.S. PATENT DOCUMENTS

| | | | |
|---|---|---|---|
| 2009/0174901 A1* | 7/2009 | Shigehisa et al. | 358/1.15 |
| 2010/0030707 A1* | 2/2010 | Jingu | 705/400 |
| 2011/0026079 A1* | 2/2011 | Nakagawa | 358/1.15 |
| 2011/0261402 A1* | 10/2011 | Yamamoto | 358/1.15 |
| 2012/0033245 A1* | 2/2012 | Kurahashi | 358/1.14 |
| 2012/0192259 A1* | 7/2012 | Yin | 726/7 |
| 2012/0250066 A1* | 10/2012 | Kikumoto et al. | 358/1.14 |
| 2013/0085968 A1* | 4/2013 | Schultz et al. | 705/400 |
| 2013/0141747 A1* | 6/2013 | Oba et al. | 358/1.14 |

FOREIGN PATENT DOCUMENTS

| | | |
|---|---|---|
| JP | 2005-262579 A | 9/2005 |
| JP | 2006-277257 A | 10/2006 |
| JP | 2008-049682 A | 3/2008 |
| JP | 2008-311895 A | 12/2008 |
| JP | 2009-061728 A | 3/2009 |
| JP | 2010-208075 A | 9/2010 |

* cited by examiner

DEVICE, INFORMATION PROCESSING APPARATUS, INFORMATION PROCESSING SYSTEM, CONTROL METHOD, AND PROGRAM

TECHNICAL FIELD

The present invention relates to a technique for outputting print data using user input information.

BACKGROUND ART

To request a user to enter a password for printing, a printer driver often displays a dialog at the time of printing and waits for input from the user. The printer driver then executes printing using a value entered by the user (see Patent Literature (PTL) 1).

CITATION LIST

Patent Literature

PTL 1: Japanese Patent Laid-Open No. 2001-318779

In confidential printing, unlike in the case of PTL 1, there are cases where an OS running on an information processing apparatus cannot automatically prompt the user to enter user input information at the time of print execution. In such cases, where the user cannot enter user input information at the time of print execution, a device cannot acquire user input information necessary to output print data.

In departmental management and FAX transmission, as well as in confidential printing, there are cases where the OS cannot automatically prompt the user to enter user input information necessary.

SUMMARY OF INVENTION

A device of the present invention for solving the problem described above includes control means for notifying an information processing apparatus of an execution instruction to cause an application on the information processing apparatus to execute predetermined processing when the information processing apparatus requires entry of user input information after reception of print data, receiving user input information corresponding to the print data from the information processing apparatus following the notification of the execution instruction, and controlling an output operation on the basis of the user input information and the print data.

Another device of the present invention for solving the problem described above includes control means for notifying an information processing apparatus of an execution instruction when the information processing apparatus requests confidential printing, receiving user input information corresponding to print data from the information processing apparatus after the notification of the execution instruction, and controlling an output operation on the basis of the user input information and the print data.

Further features of the present invention will become apparent from the following description of exemplary embodiments with reference to the attached drawings.

DESCRIPTION OF EMBODIMENTS

Figure 1:
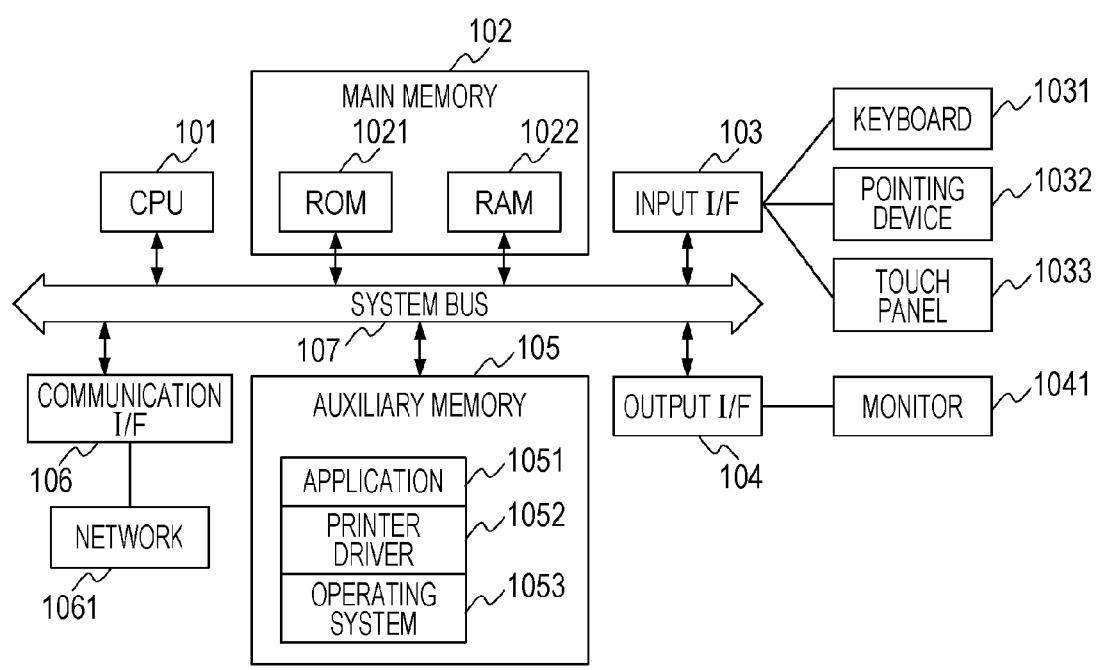
FIG. 1 is a block diagram of a client.

First Embodiment (Configuration of Client)
FIG. 1 is a block diagram of a client 201.

It is to be understood that, unless otherwise stated and as long as the functions of the present invention are executed, the present invention is applicable to any system, regardless of whether it is a single functional unit, a system composed of a plurality of devices, or a system where connection is established and processing is performed through a network.

A CPU 101 controls the overall operation of the apparatus in accordance with a program stored in a ROM 1021 or RAM 1022 of a main memory 102, or in an auxiliary memory 105. The RAM 1022 also serves as a work area for various processing performed by the CPU 101. The auxiliary memory 105 stores an operating system (OS) 1053 and application software 1051. Input devices, such as a keyboard 1031, a pointing device (e.g., mouse) 1032, and a touch panel 1033, are for the user to give various instructions through an input I/F 103 to the computer. An output I/F 104 is an interface for outputting data to the outside. The output I/F 104 outputs data to output devices, such as a monitor 1041 and a printer 1042. The client 201 may be directly connected through a local I/O line to the printer 1042, or may be connected through a communication I/F 106 and a network 1061 to the printer 1042. Reference numeral 107 denotes a common data system bus through which data is transmitted and received between interfaces and modules.

When the CPU 101 executes processing in accordance with a program stored in the auxiliary memory 105, a software configuration of the computer (see FIG. 3) and an operation in each step of a flowchart (described below) are realized.

Figure 2:
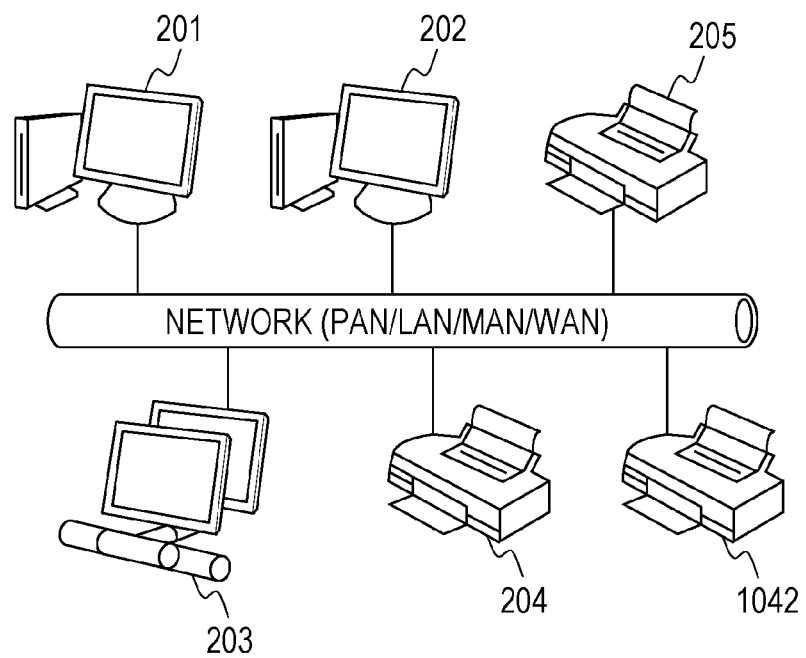
FIG. 2 illustrates a configuration of a network to which clients, a server, and printers are connected.
Figure 3:
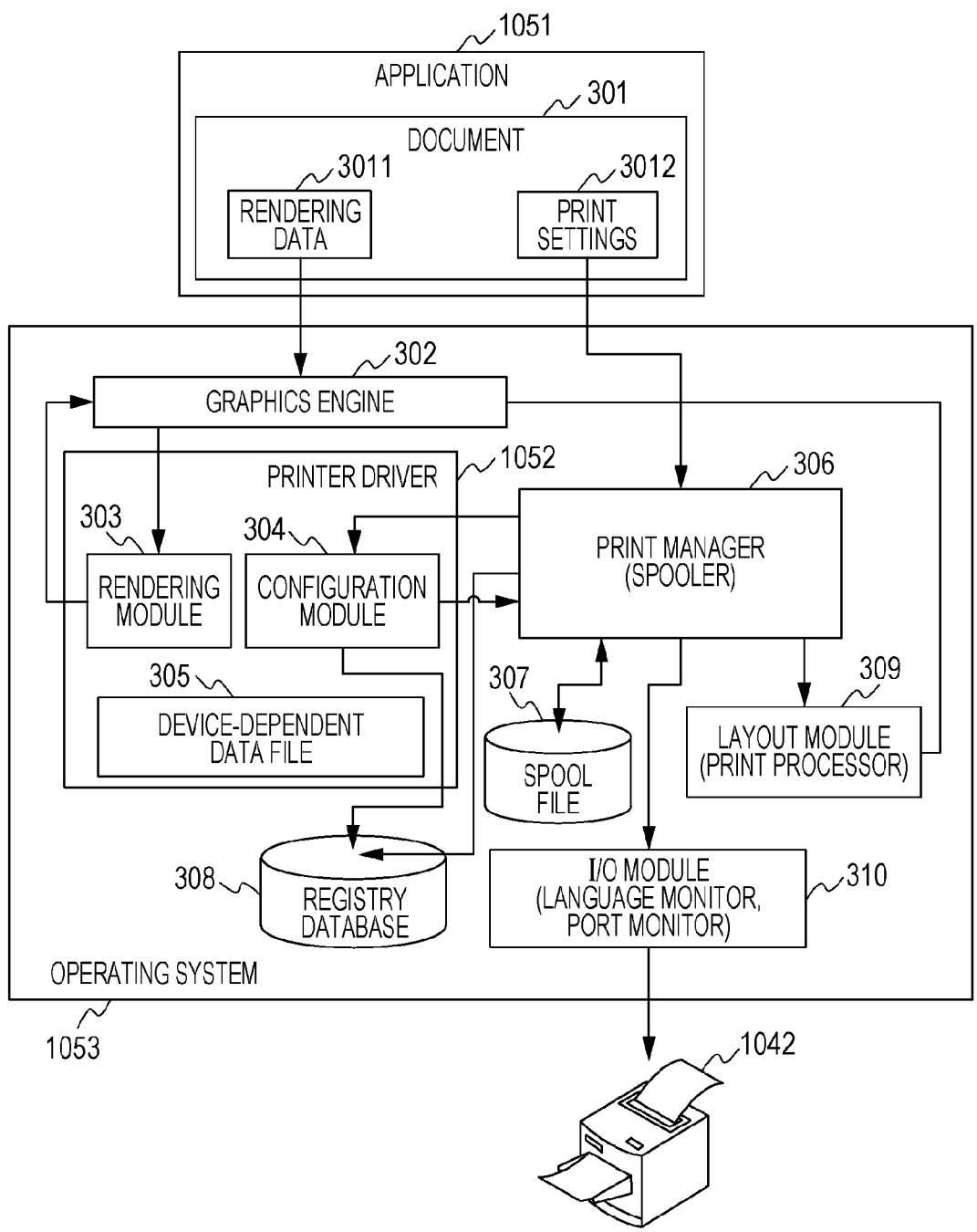
FIG. 3 is a block diagram illustrating a print processing system of a client.

The client 201 may either be a PC or a mobile terminal.
(Configuration of Network)
FIG. 2 is a simplified view of an environment of the network 1061. One or more clients 201 and 202 that create documents and images to be printed are connected to the network. A server computer 203 that manages printers and users of the clients may be connected to the network. One or more printers 204 and 205 are connected to the network. Like the printer 205, a printer physically connected to the network may actually be an off-line printer which is not available for use. The network includes small to large-scale networks, such as a personal area network (PAN), a local area network (LAN), a metropolitan area network (MAN), and a wide area network (WAN). The devices described above are connected to all of these networks. The server 203 may be a cloud server.
(Print Processing System)
FIG. 3 illustrates a print processing system of the client 201. The application 1051, the printer driver 1052, and the operating system 1053 are stored in the auxiliary memory 105 illustrated in FIG. 1. A graphics engine 302 and a print manager 306 are modules included in the operating system 1053. The user uses an input device, such as the keyboard 1031 or the mouse 1032, to execute print processing of a document 301 created using the application program 1051 displayed on the monitor 1041, which is an output device.

The print processing is executed by performing the following three operations in sequence: selecting a printer, creating print settings, and converting rendering data. First, selecting a printer involves selecting a print queue corresponding to the printer 1042 that executes printing. Next, creation of print settings 3012 is performed. A configuration module 304 of the printer driver 1052 creates initial values of the print settings 3012 for a document. The created print settings 3012 are changed, using the user interface of the application 1051 or printer driver 1052, to obtain a final print result intended by the user. For example, an output paper size is changed and print options, such as duplex printing and black-and-white printing, are selected.

The configuration module 304 provides a user interface of the printer driver 1052. The print settings 3012 are stored on the RAM 1022 in a binary data structure or in a markup language, such as XML. This format varies depending on the specification of the printer driver 1052 or operating system 1053. The print settings 3012 are created for each document printing. For saving optional device configuration settings of the printer 1042 or preference settings of each user, the printer driver 1052 stores the settings in a registry database 308 of the operating system 1053. Default values of the print settings 3012 for each user are stored, in the registry database 308, by the print manager 306 of the operating system 1053.

Finally, conversion of rendering data is performed.

After creation of the print settings 3012, the user instructs the application 1051 to perform print processing. The application 1051 notifies the operating system 1053 of the print processing instruction. Through the graphics engine 302, the operating system 1053 performs rendering for the printer driver 1052 specified. If layout processing is specified in the print settings 3012, a temporary spool file 307 is created before the processing proceeds to a rendering module 303 of the printer driver 1052, and the print manager 306 starts a layout module 309.

The layout processing involves changing the order of pages and assigning a plurality of logical pages to one physical page. After changing the layout, the layout module 309 performs rendering for the printer driver 1052 again.

Upon receipt of the rendering data, the printer driver 1052 causes the rendering module 303 to convert the rendering data into a printer control language, that is, a data language that can be understood by printers.

At the same time, the printer driver 1052 may also convert the print settings 3012 into the printer control language. For convenience in explanation, the rendering data and the print settings converted to the printer control language will hereinafter be described as being different from each other.

Both the rendering module 303 and the configuration module 304 are often common to a plurality of types of printers 1042. Device-to-device differences are described in a device-dependent data file 305. The rendering module 303 and the configuration module 304 refer to the device-dependent data file 305 as necessary.

The printer control language obtained through conversion by the printer driver 1052 is sequentially stored as the spool file 307.

The print manager 306 acquires the spool file 307 and manages the schedule of data print processing. When the printer becomes ready to print, the print manager 306 sequentially transmits data through an I/O module 310 to the printer 1042.

Thus, the rendering data from the application is converted into the printer control language and printed. Hereinafter, the printer control language will be referred to as print data.

(Print Setting)

To create the print settings 3012 for the document 301, the application directly rewrites the print settings 3012 or the user rewrites the print settings 3012 using a user interface (see FIG. 5) provided by the configuration module 304 of the printer driver 1052.

Figure 5:
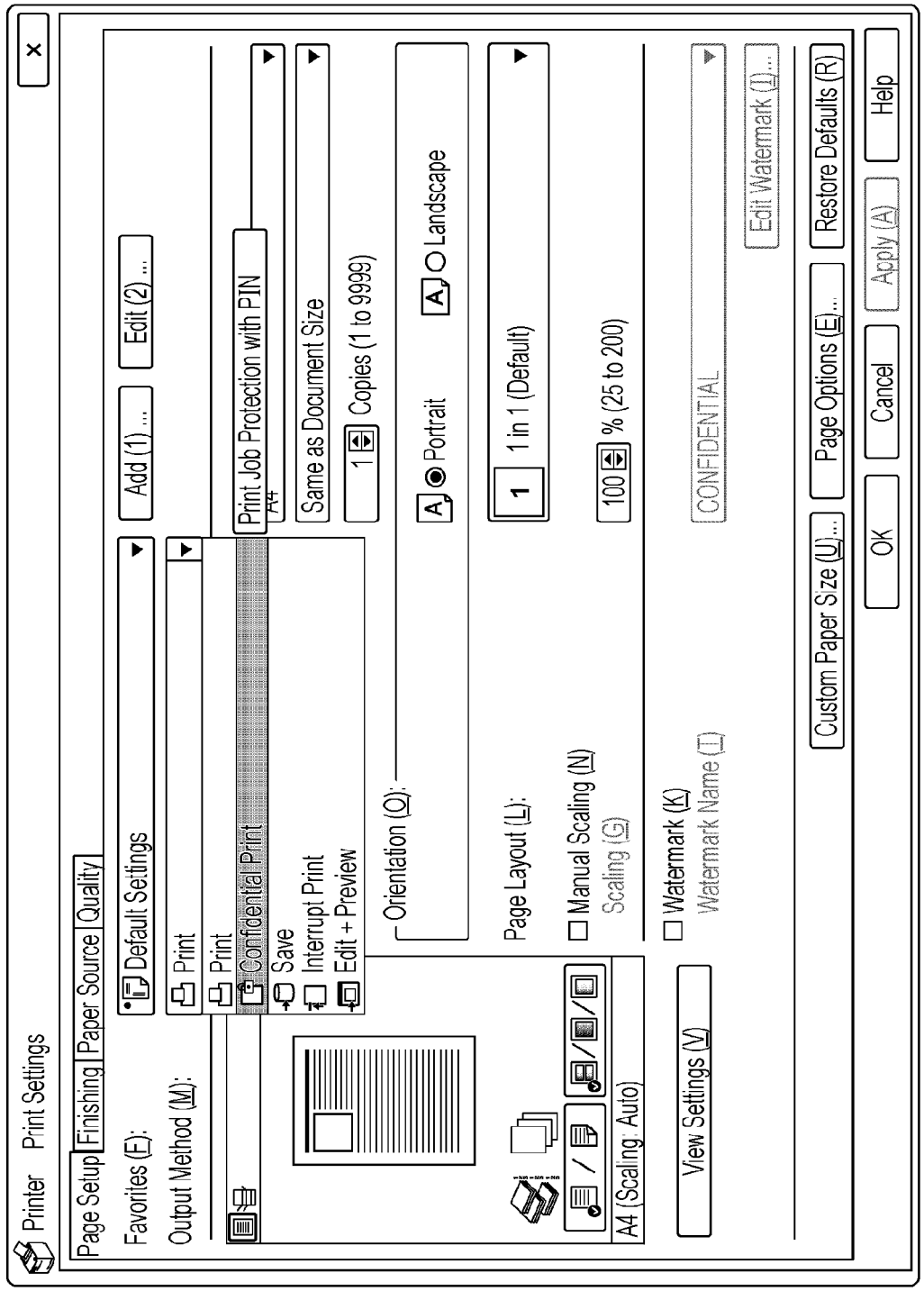
FIG. 5 illustrates a user interface of a printer driver.

The user performs print setting by selecting Confidential Print on the interface illustrated in FIG. 5.

Figure 4:
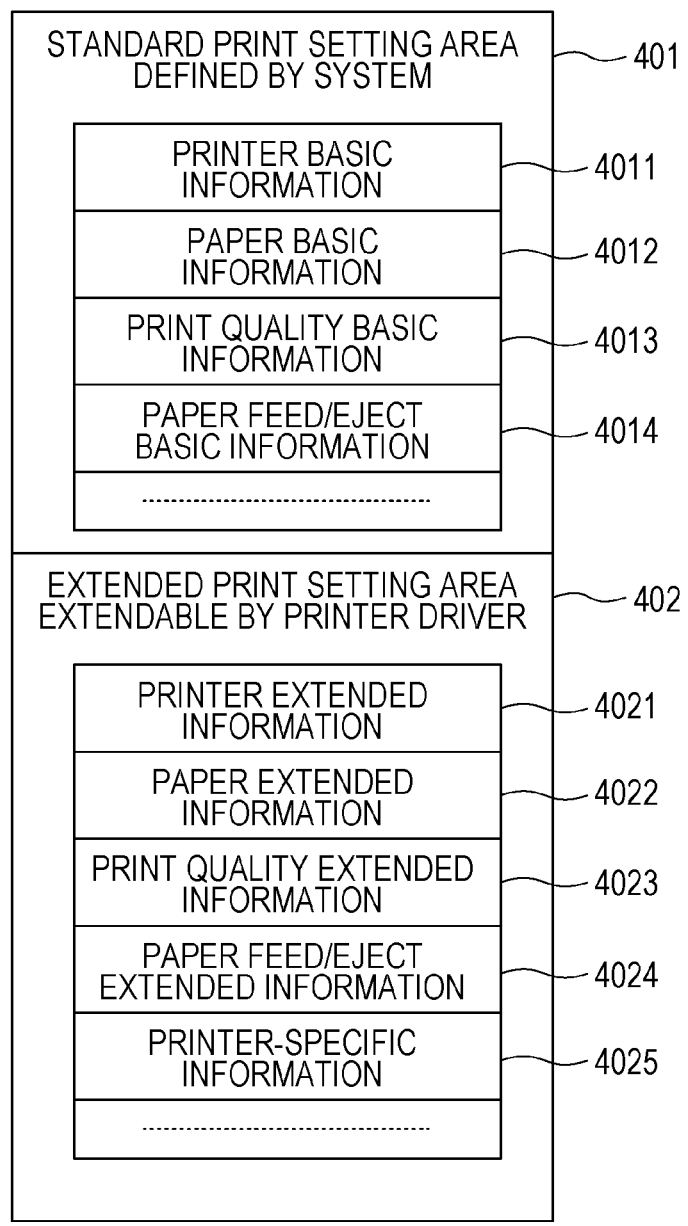
FIG. 4 is a block diagram illustrating a data structure of a DEVMODE structure which provides print settings.

The print settings 3012 have a structure called DEVMODE structure (see FIG. 4) in the Microsoft (registered trademark) Windows (registered trademark) operating system.

The DEVMODE structure is divided into a standard setting area 401 publicly defined by the operating system and a setting area 402 extended by the printer driver.

The standard setting area 401 contains basic print setting values for changing the paper size and the paper feed stage, switching between color and black-and-white modes, etc.

The extended setting area 402 contains values for a paper eject function and a fine color adjustment function corresponding to printer options.

The application is unable to recognize the extended settings of each printer driver 1052. That is, the only print settings that can be directly rewritten by the application are those in the standard setting area 401 defined by the system.

Therefore, the application typically displays a user interface of the printer driver 1052 to allow the user to make print settings in the extended setting area 402.

The configuration module 304 provides not only the user interface, but also an application programming interface (API). Therefore, it is possible to make print settings in the extended setting area 402 from the outside without displaying the user interface.

However, when the API of the configuration module 304 is used, the application needs to support each printer driver 1052. Therefore, a typical application makes changes only to the standard setting area 401.

(Configuration of Printer)

Figure 6:
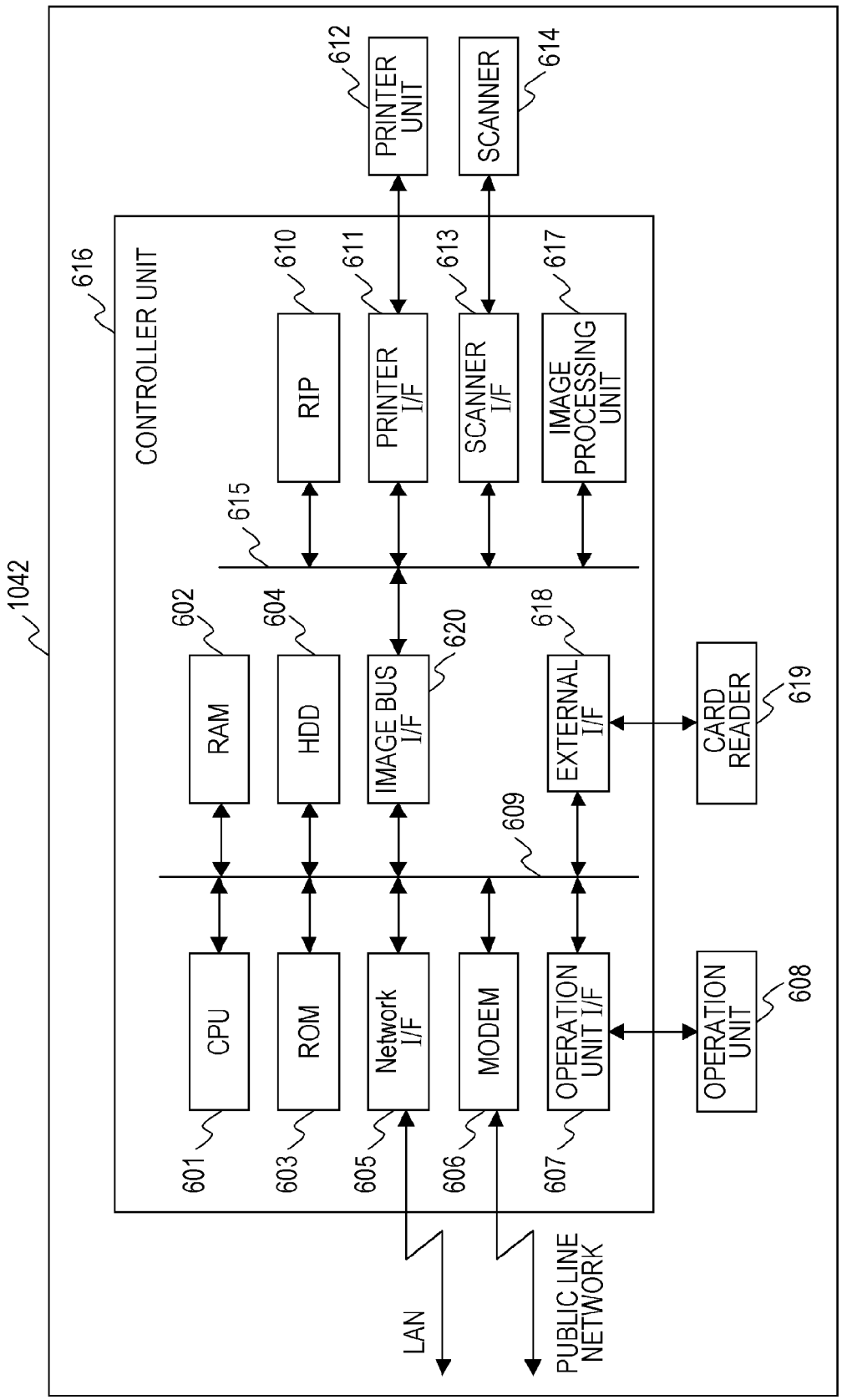
FIG. 6 is a block diagram of a printer.

FIG. 6 is a block diagram of the printer 1042. In FIG. 6, reference numeral 616 denotes a controller unit, which is connected to a scanner 614 serving as an image input unit and to a printer unit 612 serving as an image output unit. The controller unit 616 is connected to a network, such as a LAN or a public line (WAN), to input and output image data and information about a finisher configuration of the printer.

Reference numeral 601 denotes a CPU in the controller unit 616. The CPU 601 is a processor that controls the overall operation of the system.

The CPU 601 executes processing in accordance with a program stored in a hard disk drive 604. Thus, an operation in each step of the flowchart (described below) is realized.

Reference numeral 602 denotes a RAM. The RAM 602 serves not only as a system work memory for operation of the CPU 601, but also as a program memory for storing programs, and as an image memory for temporarily storing image data.

Reference numeral 603 denotes a ROM in which a system boot program and various control programs are stored.

Reference numeral 604 denotes a hard disk drive (HDD) in which image data and various programs for system control are stored. Reference numeral 607 denotes an operation unit interface (I/F) serving as an interface with an operation unit (UI) 608. Image data to be displayed on the operation unit 608 is output from the operation unit I/F 607 to the operation unit 608. Also, the operation unit I/F 607 serves to notify the CPU 601 of information (e.g., user information) entered by the user of the present system from the operation unit 608. The operation unit 608 includes a display with a touch panel. The user can give various instructions by pressing buttons displayed on the display (i.e., by touching the buttons with a finger).

Reference numeral 605 denotes a network interface (I/F), which is connected to the network and performs data input and output.

Reference numeral 606 denotes a modem, which is connected to the public line and performs data input and output, such as FAX transmission and reception.

Reference numeral 618 denotes an external interface (I/F), which accepts an external input from a USB, an IEEE1394 bus, a printer port, etc.

For use in user authentication, a card reader 619 for reading an IC card may be optionally connected to the external I/F 618. When the card reader 619 is connected, the CPU 601 can control, through the external I/F 618, the reading operation of the card reader 619 for reading information from an IC card, and acquire the information read from the IC card.

Reference numeral 620 denotes an image bus interface (I/F). The image bus I/F 620 serves as a bus bridge that connects a system bus 609 to an image bus 615 for high-speed transfer of image data, and converts a data structure. The image bus 615 is a PCI bus or an IEEE1394 bus.

Reference numeral 610 denotes a raster image processor (RIP) which expands, for example, vector data (e.g., PDL code) into a bitmap image. Reference numeral 611 denotes a printer interface (I/F), which connects the printer unit 612 to the controller unit 616 and performs synchronous/asynchronous conversion of image data. Reference numeral 613 denotes a scanner interface (I/F), which connects the scanner 614 to the controller unit 616 and performs synchronous/asynchronous conversion of image data.

Reference numeral 617 denotes an image processing unit that corrects, processes, and edits input image data and performs printer correction and resolution conversion on print output image data. Additionally, the image processing unit 617 rotates image data, performs JPEG compression/decompression on multivalued image data, and performs JBIG, MMR, or MH compression/decompression on binary image data.

The scanner 614 illuminates an image on a document sheet, scans the image with a CCD line sensor, and converts the scanned image into an electrical signal, which is raster image data. Document sheets are placed on a tray of a document feeder. A printer user gives a reading start instruction from the operation unit 608. In response to this, the CPU 601 instructs the scanner 614 to read document images on document sheets, which are fed one by one by the feeder.

The printer unit 612 is configured to convert raster image data into an image on a sheet. For example, the printer unit 612 uses an electrophotographic method or an inkjet method to create a printed matter. The electrophotographic method involves using a photosensitive drum and a photosensitive belt, and the inkjet method involves ejecting ink from a micronozzle array to directly print an image on a sheet. The print operation is started by an instruction from the CPU 601. The printer unit 612 has a plurality of paper feed stages and the corresponding paper cassettes to allow selection of different paper sizes and different paper orientations.

The operation unit 608 includes an LCD unit having an LCD with a touch panel sheet attached thereon. The operation unit 608 displays a system operation screen. When a displayed key is pressed, the operation 608 notifies the CPU 601, through the operation unit I/F 607, of the corresponding positional information. The operation unit 608 includes various operation keys, such as a start key, a stop key, an ID key, and a reset key. The start key of the operation unit 608 is used, for example, to start an operation of reading a document image. The start key has a two-color (green and red) LED in the center thereof to indicate whether the start key is ready for use. The stop key of the operation unit 608 is used to stop an operation in progress. The ID key of the operation unit 608 is used to enter a user ID of the user. The reset key is used to initialize settings from the operation unit.

The card reader 619 reads information stored in an IC card under the control of the CPU 601, and notifies the CPU 601 of the read information through the external I/F 618.

(Touch-Panel Print Application)

The client 201 executes a print application for touch panels (hereinafter referred to as a touch-panel print application) related to printing operations.

A touch-panel print application refers to an application that has a function of responding to print-related settings associated with the printer driver and to a notification from the printer. Main functions of the touch-panel print application include providing a UI that allows print settings to be made and receiving a PrinterEvent (execution instruction) from the device. These functions will be described later on.

A PrinterEvent refers to a file that the printer transmits to the touch-panel print application on the client. Upon receipt of the PrinterEvent, the touch-panel print application executes processing of an event corresponding to the PrinterEvent.

The description of the present specification is based on the assumption that the touch-panel print application is always running on the client 201 and is ready to receive a PrinterEvent.

The touch-panel print application may be configured to start upon receipt of a PrinterEvent on the client 201. In this case, the operating system 1053 may be configured to start the touch-panel print application upon receipt of a PrinterEvent.

The touch-panel print application and a general-purpose application for touch panels (hereinafter referred to as a touch-panel general-purpose application) described below are designed to be operated with the touch panel 1033 and the pointing device 1032. However, they may be designed to be operated only with the pointing device 1032.

The touch-panel print application is preferably installed simultaneously with the installation of the printer driver. This is because, in the present specification, the touch-panel print application and the printer driver operate in a synchronized manner. Thus, the description of the present embodiment is based on the assumption that the printer driver and the touch-panel print application are already installed on the client and are associated with each other.

Web Services on Devices (WSD) used in transmitting and receiving a PrinterEvent will now be briefly described. WSD is a technique used to discover a device (i.e., a printer in the present embodiment) on the network, use functions of the device, and acquire information about the device.

The present specification describes a system that uses WSD as a communication means of a port monitor. As another communication means of the port monitor, TCP/IP communication or USB may be used to connect the client to the printer. With WSD, the device can automatically transmit a PrinterEvent. With WSD, for example, if a finisher configuration of the printer is physically changed, it is possible to broadcast the finisher change notification to all clients.

However, if the communication means of the port monitor is TCP/IP communication, the PrinterEvent cannot be transmitted on the initiative of the device. Instead, the client needs to check the state of the device using a polling function. Specifically, if the communication means of the port monitor is TCP/IP communication, the client 201 uses a polling function or the like to check and acquire a PrinterEvent notification from the device to the client 201, so that the same function as that of the present embodiment can be realized.

As described below, the printer 1042 has a user authentication function and a job saving function and associates user input information with print data. Thus, it is possible to use a confidential printing function which does not allow printing without user authentication.

In the present embodiment, a user name and password in confidential printing will be described as an example of user input information for printing.

User input information provided by the printer driver can include departmental management information and FAX information. A user name and password is not entered when confidential printing is not performed.

Specifically, if the printer 1042 uses departmental management information, instead of a user name, and saves a log that associates the departmental management information with a job of print data, the user can calculate the printing cost for each department. The FAX information includes a phone number. When FAX information is entered, the printer 1042 performs FAX transmission on the basis of print data and a phone number. In FAX transmission, the device does not necessarily perform printing on the basis of print data. However, data transmitted by the client 201 will be referred to as print data, as in the case of confidential printing and departmental management. The printer unit 612 may be optional if the device performs FAX transmission only.

Hereinafter, in the present specification, entering user input information will be referred to as entering a password.

Examples of methods for authentication, other than entering a user name and password, include using a personal identification number, a contact/noncontact-type key or card, biometrics, or some combinations of them. The present specification will hereinafter be described on the assumption that a user name and password is used for authentication.

(Flow of Printing: Printer)

Processing performed by the printer 1042 according to the present embodiment will now be described with reference to the flowchart of FIG. 7.

First, print processing on the printer side will be described.

In step SB700, print processing on the printer side starts.

In step SB701, the printer 1042 receives print settings and print data from the client 201.

In step SB702, the printer 1042 determines, from the print settings, whether the print data is for confidential printing. If the printer 1042 determines that the print data is not for confidential printing, the processing proceeds to step SB712. Then, the print data starts to be output and the print processing ends. If the printer 1042 determines that the print data is for confidential printing, the processing proceeds to step SB703.

To realize confidential printing, the user may set a password on the client before transmitting data, so that the user does not have to enter the password on the client after the printer receives the data. In this case, since user input information accompanies the data transmitted from the client to the printer, the client does not have to prompt the user to enter a password after the client transmits the data. Therefore, if the printer 1042 determines in step SB703 that there is no need to enter information on the client 201, the processing proceeds to step SB704, where the received data is registered as a confidential print job in the printer 1042. If the printer 1042 determines in step SB703 that information needs to be entered on the client 201, the processing proceeds to step SB705.

In step SB705, the printer 1042 transmits a PrinterEvent to the client 201. The PrinterEvent is written in a format (e.g., XML format) that can be read by the touch-panel print application. The PrinterEvent contains, for example, an instruction to prompt the user for input, a job identifier for identifying the confidential print job, an IP address of the printer 1042, a print data name, and a user name.

For example, a universally unique identifier (UUID) may be used as the job identifier. By associating a UUID with each job and writing the UUID in the PrinterEvent, the job can be easily associated with the PrinterEvent.

The IP address is used by the printer 1042 to communicate with the client 201. The IP address may not be necessary if the printer 1042 can communicate with the client 201.

In step SB706, the printer 1042 waits for a cancellation instruction or user input information from the client 201. Executing the step of waiting for a cancellation instruction or user input information in step SB706 does not interrupt the other functions of the printer 1042. Therefore, multiple users can simultaneously execute confidential printing in accordance with the flowchart of FIG. 7.

The printer 1042 may be configured to delete print data if no user input information is received for a certain length of time. However, when the printer 1042 is configured to receive a cancellation instruction, the printer 1042 can determine whether the user actually intends to cancel the confidential printing or still wants to continue the confidential printing even though the connection between the client 201 and the printer 1042 has been lost.

In step SB707, if the information received is a cancellation instruction, the processing proceeds to step SB713, where the print processing ends. If the information received is not a cancellation instruction, the processing proceeds to step SB708.

In step SB708, if the information received is user input information, the processing proceeds to step SB709. If the information received is not user input information, the processing returns to step SB706, where the printer 1042 enters the waiting state again.

In step SB709, the printer 1042 associates the received user input information with the print data by using a job identifier, and registers them as a confidential print job in the printer 1042.

In step SB710, the user logs in to the printer 1042 and selects, from registered confidential print jobs, a job the user wants to print. A confidential print job has a function of asking the user for a password after selection of the job. Therefore, the printer 1042 accepts the input of a password here.

In step SB711, the printer 1042 compares the password the user has entered on the printer 1042 with the password for the registration of the confidential print job.

If these passwords match, the processing proceeds to step SB712. If the password entered on the printer 1042 is incorrect, the processing returns to the job selection screen in step SB710, where the user is prompted for input again.

The printer 1042 may be configured such that the user can select, without logging in to the printer 1042, a confidential print job the user wants to print from a list of registered jobs, and is asked to enter a password after the selection of the confidential print job.

In step SB712, the printer 1042 starts to output the print data. In step SB713, the print processing ends. If the user input information contains departmental management information, the printer 1042 associates the departmental management information with the job of the print data and saves them. If the user input information contains a phone number, the printer 1042 transmits the print data on the basis of the phone number.

(Flow of Printing: Client)

Processing performed by the client 201 will now be described.

In step SA700, confidential print processing in the client 201 starts.

In step SA701, printing is executed from the touch-panel general-purpose application by the user on the client 201. This means that a printing instruction is executed by selecting any print queue from the touch-panel general-purpose application. In response to a print execution instruction from the user, the printer driver transmits print data and print settings to a predetermined printer. The print settings contain data indicating that the print data is for confidential printing.

In step SB703 of the confidential printing described above, data transmitted from the client to the printer contains a password. For the client side, however, a description will be given only of processing in which the client 201 asks the user to enter a password after transmitting the data.

In step SA702, the client 201 receives a PrinterEvent from the printer 1042.

In step SA703, the touch-panel print application running on the client 201 starts processing corresponding to the PrinterEvent received in step SA702.

In step SA704, the touch-panel print application running on the client 201 displays a password entry screen. The displayed screen preferably has a user-friendly UI suitable for a touch panel. To realize a user-friendly UI, the client 201 can provide larger buttons or display the touch-panel print application over the entire screen.

Instead of directly displaying the password entry screen for the touch-panel print application, the client 201 may display a dialog that prompts the user to start the touch-panel print application.

A UI illustrated in FIG. 8 will now be described.

Reference numeral 800 denotes a screen for the touch-panel print application. Upon receipt of a PrinterEvent from the printer 1042, the touch-panel print application can prompt the user for input with a user-friendly UI suitable for a touch panel.

Reference numeral 801 denotes a field where a print data name can be displayed and edited. The input I/F 103 is used for input. Reference numeral 802 denotes a field where a user name is displayed. Reference numeral 803 denotes a field where a password can be entered. The functions of buttons denoted by reference numerals 810 and 820 will be described later on.

Figure 8:
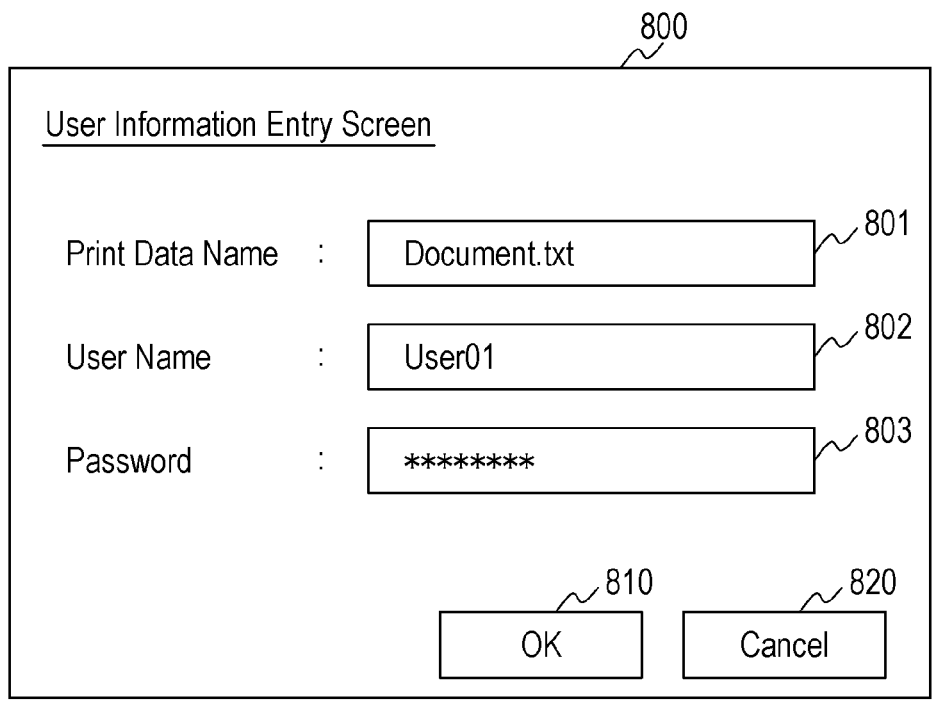
FIG. 8 illustrates a user interface that prompts the user of a touch-panel print application for input.

The touch-panel print application may call another application which displays the UI illustrated in FIG. 8.

Although the user is prompted for input for one job in the present embodiment, there are cases where user input is required for a plurality of jobs. For example, assume that the user suspends the execution of the touch-panel print application without entering user input information on the touch-panel print application. Here, the suspension means that the user switches from the currently active application to another application. Then, after the suspension, if the user executes printing on the touch-panel print application, the user is required to enter user input information twice, for the first execution of printing on the touch-panel print application and the second execution of printing after the suspension.

In this case, it is possible that the user input information corresponding to the first execution of printing cannot be entered. If the touch-panel print application is configured to save a list of jobs waiting for user input, and allow the user to enter user input information for a job selected by the user, user input information can be entered twice for the two printing operations described above.

In step SA705, the touch-panel print application running on the client 201 waits for input from the user.

In step SA706, the client 201 determines whether printing has been cancelled in step SA705.

If the Cancel button 820 is pressed in step SA705, the client 201 determines that the printing has been cancelled. In this case, the client 201 transmits a cancellation instruction to the printer 1042 so as to cancel the registration of the corresponding print data in the printer 1042. The printing can be regarded as being cancelled if no input has been received for a certain length of time in step SA705. Then the processing proceeds to step SA709.

When the user enters a password in the field 803 and presses the OK button 810 in step SA705, the processing proceeds to step SA708.

In step SA708, the client 201 transmits user input information to the printer 1042. Then, the processing proceeds to step SA709.

In step SA709, the client 201 terminates the processing in the touch-panel print application and resumes the processing in the touch-panel general-purpose application.

In step SA710, the print processing ends.

As described above, even when the OS cannot automatically prompt the user to enter user input information at the time of print execution, the client can prompt the user to enter user input information by acquiring a notification from the device. Thus, the client can instruct the device to perform an output operation based on user input information and print data.

Second Embodiment

Although the device makes various determinations in the first embodiment, such determinations can be made by the touch-panel print application installed on the client. In the present embodiment, after executing printing, the client 201 transmits, to the device, an instruction to transmit a PrinterEvent. In response to this, the device transmits, to the client 201, the PrinterEvent corresponding to the instruction. The client 201 performs processing corresponding to the PrinterEvent in the touch-panel print application. Thus, even if the size of print data is very large, the client 201 can immediately receive the PrinterEvent. Therefore, it is possible to solve the problem of taking much time to display a user input screen.

Figure 9:
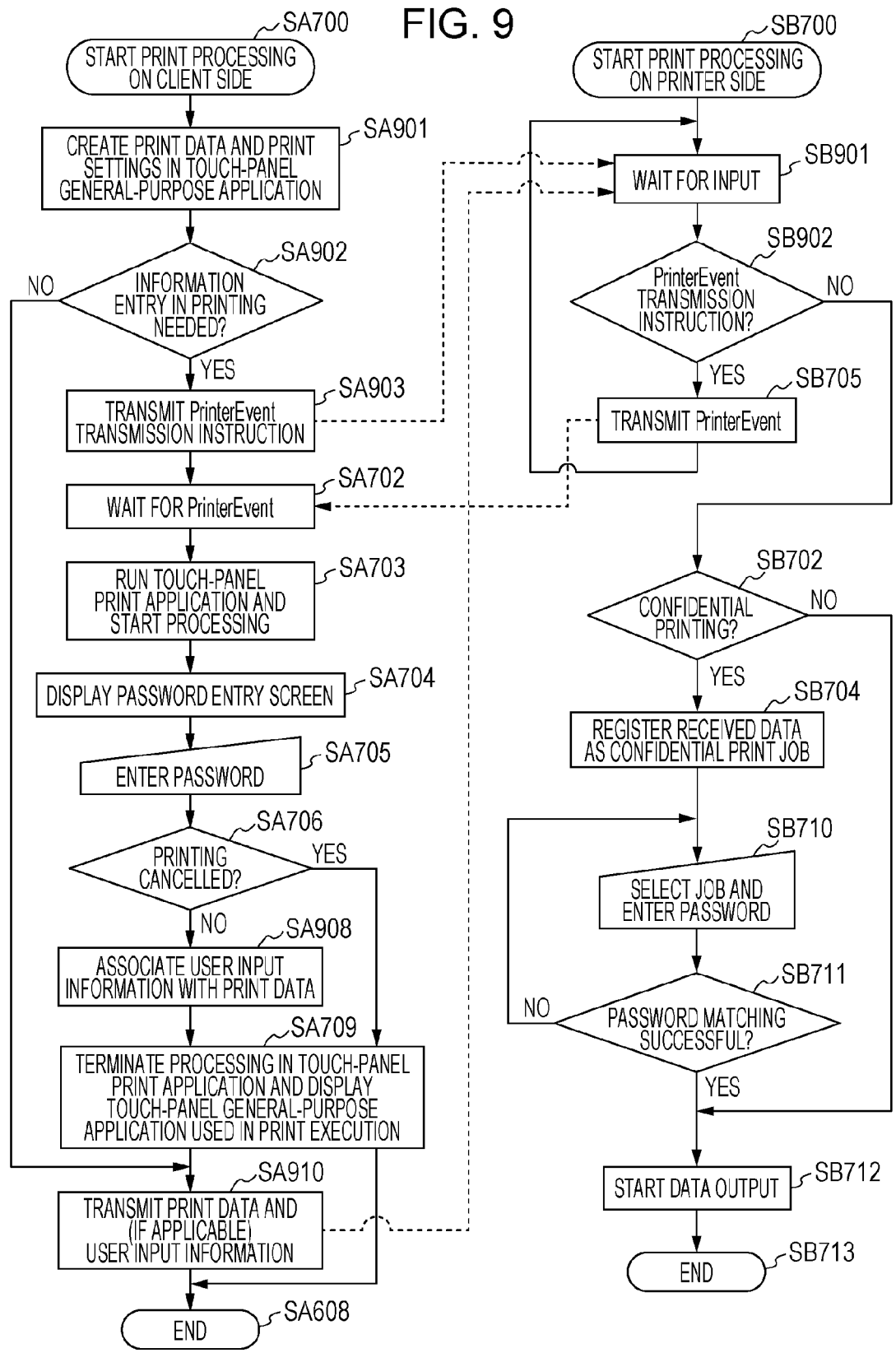
FIG. 9 is a flowchart of processing in which a touch-panel print application that prompts the user for input is displayed and user input information is applied on the client side.

The present embodiment will be described using the flowchart of FIG. 9.

Note that the same operations as those of the above-described steps will be given the same step numbers, and their description will be omitted unless otherwise stated.

First, print processing on the printer side will be described.

In step SB901, the printer 1042 waits for data or a PrinterEvent transmission instruction.

In step SB902, if the printer 1042 determines that information received is a PrinterEvent transmission instruction, the processing proceeds to step SB705.

In step SB705, the printer 1042 transmits a PrinterEvent in response to the PrinterEvent transmission instruction received from the client 201. A PrinterEvent transmission instruction refers to an instruction command that serves as a trigger for the printer 1042 to transmit a PrinterEvent to the client 201. In the present embodiment, the printer 1042 receives an instruction command to transmit a PrinterEvent that prompts the user to enter a password. Upon receipt of the instruction command, the printer 1042 transmits the PrinterEvent that prompts the user to enter a password. Then, the processing returns to step SB901.

If the printer 1042 determines in step SB902 that the information received is not a PrinterEvent transmission instruction, the printer 1042 assumes that data has been received. The processing then proceeds to step SB702.

If the printer 1042 determines in step SB702 that the received data is for executing confidential printing, the processing proceeds to step SB704.

Print processing on the client side will now be described.

In step SA901, printing is executed from the touch-panel general-purpose application by the user on the client 201. This means that a printing instruction is executed by selecting any print queue from the touch-panel general-purpose application. In step SA901, unlike step SA701 in the first embodiment, the touch-panel general-purpose application does not transmit print data to the printer 1042. Instead, the client 201 saves created print data and print settings.

In step SA902, the client 201 determines, from the print settings, whether information needs to be entered at the time of printing. If no information needs to be entered at the time of printing, that is, if a password to be entered is already set or the printing does not involve entering user input information, the processing proceeds to step SA910. After the client 201 transmits the print data and user input information to the printer 1042 in step SA910, the processing ends in step SA608.

If the client 201 determines in step SA902 that information needs to be entered at the time of printing, the processing proceeds to step SA903, where the client 201 transmits a PrinterEvent transmission instruction command to the printer 1042. This means that the client 201 requests the printer 1042 to perform confidential printing, departmental management, or FAX transmission.

The PrinterEvent transmission instruction command may be configured by transmitting, to the printer 1042, empty data which produces no printed output by being processed by the printer 1042.

Unlike the first embodiment, even if the client 201 determines in step SA706 that the printing has been cancelled, the client 201 does not transmit a cancellation instruction to the printer 1042. This is because since the printer 1042 has not yet saved the print data at the point of step SA706, there is no need for the client 201 to instruct the printer 1042 to delete the print data.

In step SA908, the client 201 associates the user input information with the print data created in step SA901.

A method for associating user input information with print data is to describe, either in the user input information or the print data, information indicating that the user input information and the print data are associated with each other. Another method is to combine the print data and the user input information into one data.

A method for associating the print data with the user input information will now be described.

When the client 201 does not simultaneously perform a plurality of confidential printing operations, there is only one piece of print data in step SA908. Therefore, it is easy to associate the PrinterEvent received from the printer 1042 with the print data.

The client 201 can simultaneously perform a plurality of confidential printing operations by using a UUID, as in the first embodiment described above. That is, when print data is issued, a job identifier, such as a UUID, is associated with the print data, and a PrinterEvent transmission instruction command including the job identifier is transmitted to the printer 1042. The printer 1042 writes, in the PrinterEvent, the job identifier included in the transmission instruction command, and transmits the PrinterEvent to the client 201. The client 201 may associate the PrinterEvent with the print data by matching the job identifier acquired from the PrinterEvent with the job identifier associated with the print data.

In step SA910, the client 201 transmits the print data and the user input information to the printer 1042.

The processing performed in and after step SB702 on the printer side according to the present embodiment is the same as the processing that involves executing confidential printing in the related art. Thus, even in the cases where the OS cannot automatically prompt the user to enter user input information at the time of printing, the client can prompt the user to enter user input information without causing significant changes to the printer as compared to the first embodiment.

Third Embodiment

After receiving a PrinterEvent, the touch-panel print application may not display an input screen for password entry. Specifically, if user input information is entered in the touch-panel print application by default, the touch-panel print application does not display an input screen for password entry after receiving a PrinterEvent. Before execution of printing, the user enters user input information in the touch-panel print application in advance.

Figure 7:
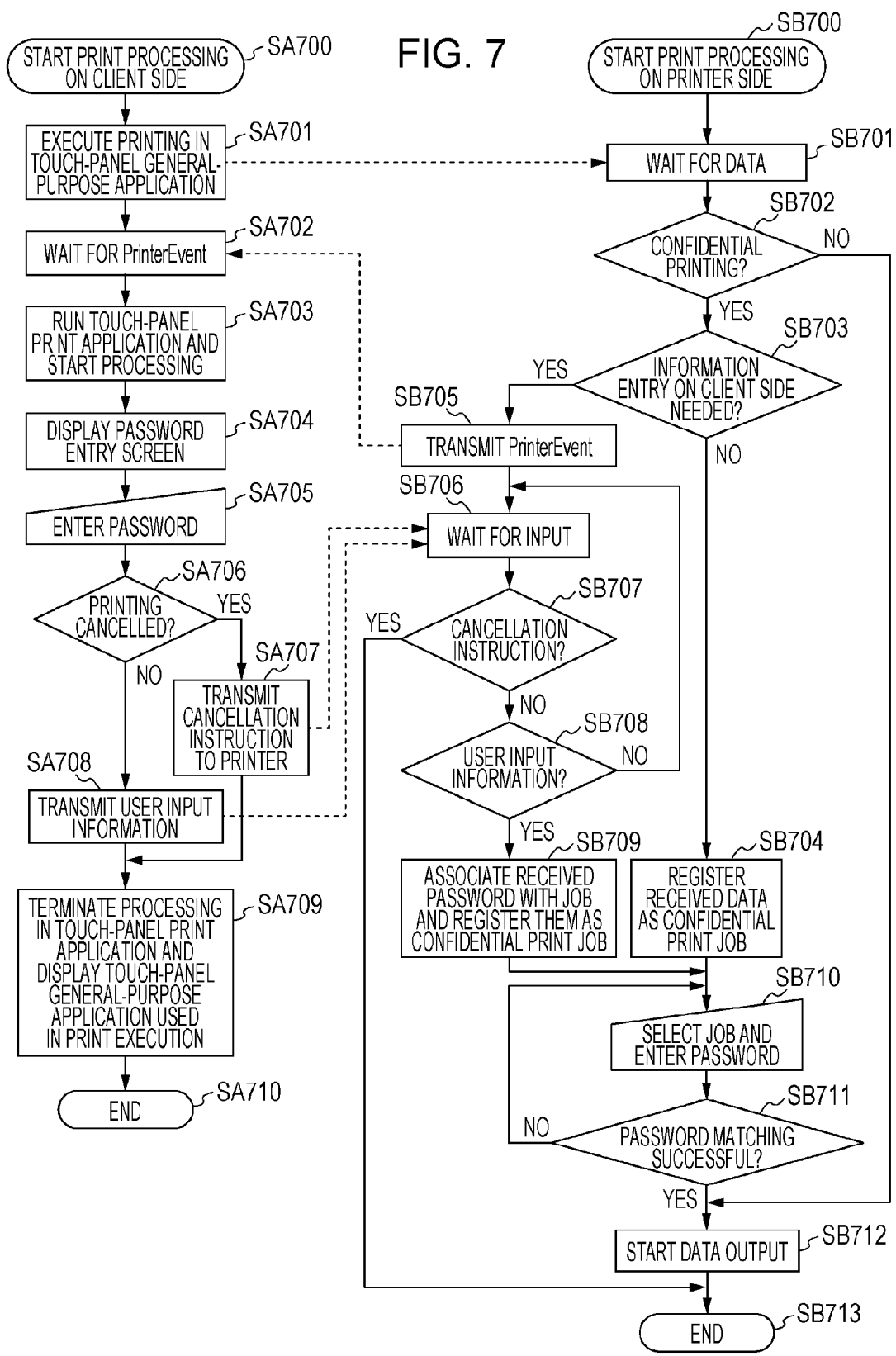
FIG. 7 is a flowchart of processing in which a touch-panel print application that prompts the user for input is displayed and user input information is applied on the printer side.

With this configuration, steps SA704, SA705, SA706, and SA707 in the flowchart of FIG. 7 are not performed. In step SA708, the client 201 transmits user input information set in advance by the user to the printer 1042. The same method is applicable to departmental management and FAX transmission.

Thus, the user can perform confidential printing, departmental management, and FAX transmission without entering user input information every time printing is executed.

Other Embodiments

The present invention is also realized by executing the following processing.

In this processing, software (program) that realizes the functions of the embodiments described above is supplied through a network or various storage media to a system or apparatus, so that a computer (or CPU or MPU) of the system or apparatus reads and executes the program.

Even when the OS cannot automatically prompt the user to enter user input information at the time of print execution, the information processing apparatus can prompt the user to enter user input information by acquiring a notification from the device. Thus, the information processing apparatus can instruct the device to perform an output operation based on the user input information and print data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2012/050920, filed Jan. 18, 2012, which is hereby incorporated by reference herein in its entirety.

The invention claimed is:

1. An information processing apparatus comprising a control unit for creating print data, acquiring an execution instruction to cause an application to execute predetermined processing from a device after the creation of the print data, displaying a screen that allows a user to enter user input information, and transmitting the user input information corresponding to the print data to the device,
- wherein the device performs an output operation on the basis of the user input information and the print data,
- wherein the control unit transmits the print data before the device performs the output operation,
- wherein when the application receives a first execution instruction and execution of the application is suspended before the application accepts entry of first user input information from the user, if the application receives a second execution instruction different from the first execution instruction after the suspension and is switched into an active mode, the application accepts entry of the first user input information and second user input information corresponding to the second execution instruction from the user.

2. A non-transitory recording medium storing a program comprising causing a computer to function as a control unit for creating print data, acquiring an execution instruction to cause an application to execute predetermined processing from a device after the creation of the print data, displaying a screen that allows a user to enter user input information, and transmitting the user input information corresponding to the print data to the device,
- wherein the device performs an output operation on the basis of the user input information and the print data,
- wherein the control unit transmits the print data before the device performs the output operation,
- wherein when the application receives a first execution instruction and execution of the application is suspended before the application accepts entry of first user input information from the user, if the application receives a second execution instruction different from the first execution instruction after the suspension and is switched into an active mode, the application accepts entry of the first user input information and second user input information corresponding to the second execution instruction from the user.

* * * * *